United States Patent [19]
Horbach

[11] 3,981,655
[45] Sept. 21, 1976

[54] MOLDING APPARATUS SELECTIVELY OPERABLE FOR EITHER INJECTION OR TRANSFER MOLDING

[76] Inventor: Stephen Horbach, 40 Glen Road, Mountain Lakes, N.J. 07046

[22] Filed: Jan. 15, 1975

[21] Appl. No.: 541,213

[52] U.S. Cl. ............................ 425/181; 425/190; 425/192 R
[51] Int. Cl.[2] .................... B29F 1/00; B29G 3/00
[58] Field of Search ......... 425/181, 190, 192, 166, 425/251, DIG. 228, 148; 92/62; 91/411 A

[56] References Cited
UNITED STATES PATENTS

| | | | |
|---|---|---|---|
| 2,453,058 | 11/1948 | Arbaugh | 425/192 X |
| 2,760,232 | 8/1956 | Rougemont et al. | 425/148 |
| 3,149,537 | 9/1964 | Fink | 92/62 X |
| 3,170,379 | 2/1965 | Dempster | 91/411 A X |
| 3,195,185 | 7/1965 | Goffin et al. | 425/190 |
| 3,196,198 | 7/1965 | Rex | 425/252 X |
| 3,362,046 | 1/1968 | Blumer | 425/251 X |
| 3,761,198 | 9/1973 | Hehl | 425/192 |
| 3,762,849 | 10/1973 | Claes | 425/190 |
| 3,764,248 | 10/1973 | Hall | 425/251 |
| 3,870,449 | 3/1975 | Stringfellow | 425/251 |
| 3,879,155 | 4/1975 | Hendry | 425/4 C |

FOREIGN PATENTS OR APPLICATIONS

| | | | |
|---|---|---|---|
| 796,596 | 6/1958 | United Kingdom | 425/148 |

*Primary Examiner*—Robert D. Baldwin
*Assistant Examiner*—David S. Safran
*Attorney, Agent, or Firm*—McAulay, Fields, Fisher & Goldstein

[57] ABSTRACT

A molding apparatus is provided having an interchangeable material feed cylinder selected either for injection molding or transfer molding. The selected material feed cylinder receives the molding material and discharges the same to the cavity mold supporting structure. Displacement means in the form of a dual piston cylinder having a selectively variable stroke is provided for feeding the molding material through the selected material feed cylinder. The apparatus further provides for control means for controlling the length of travel of the displacement means depending upon the material feed cylinder selected for use in the apparatus.

4 Claims, 6 Drawing Figures

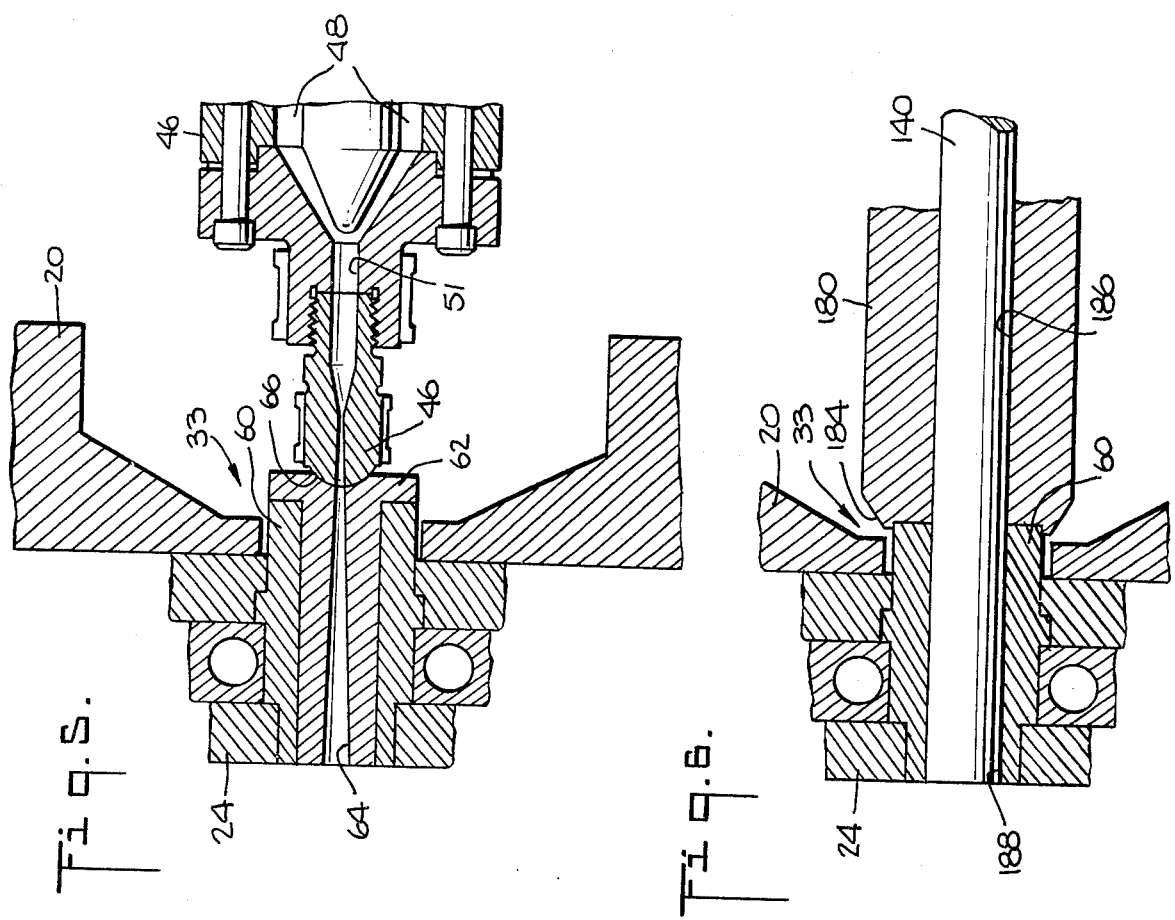

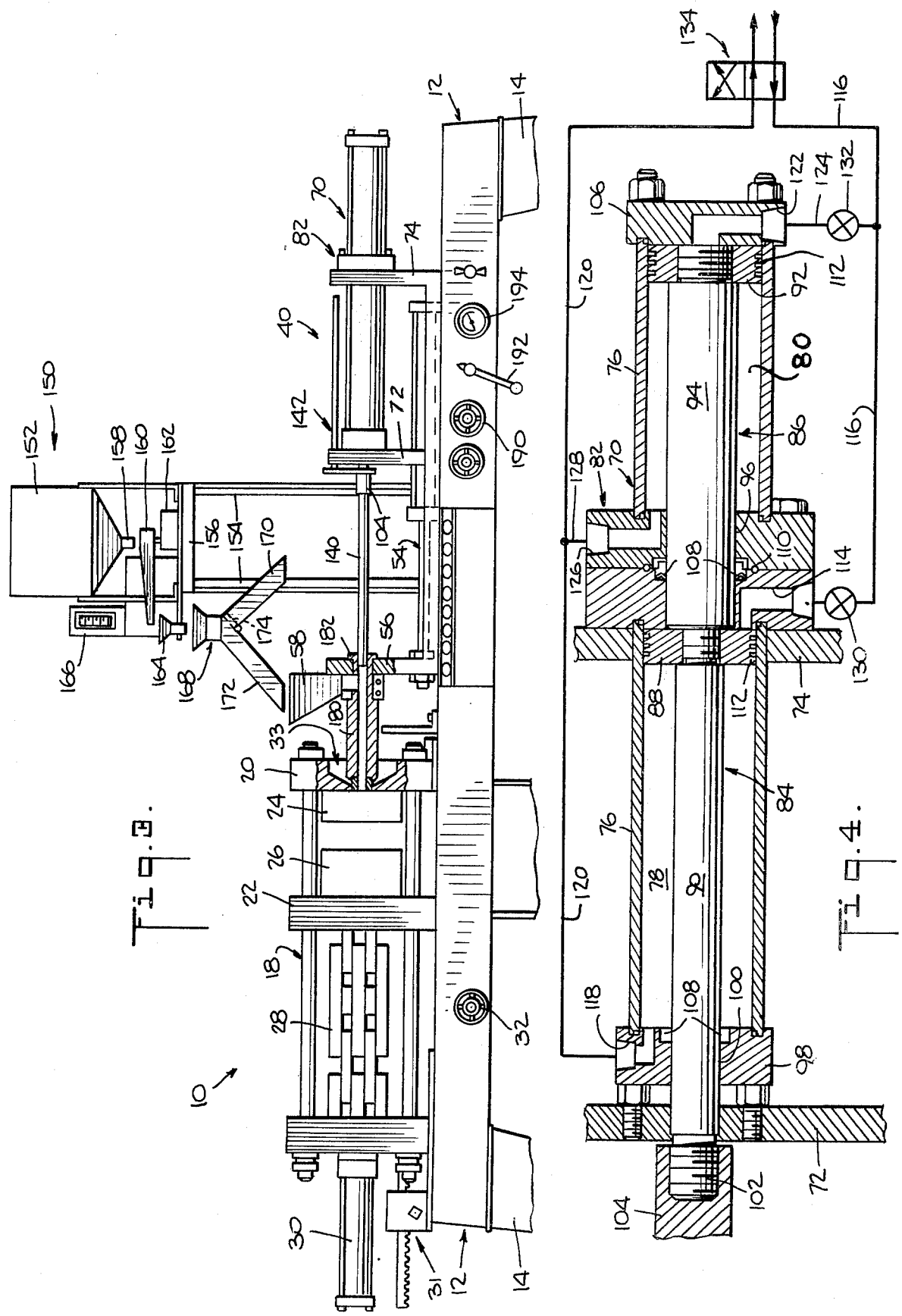

MOLDING APPARATUS SELECTIVELY OPERABLE FOR EITHER INJECTION OR TRANSFER MOLDING

BACKGROUND OF THE INVENTION

1. Field of the Invention

This invention relates generally to a molding apparatus and, more particularly, to an apparatus selectively operable for either injection or transfer molding.

2. Description of the Prior Art

The molding of plastics in various forms has been known for many years wherein the specific apparatus used in the molding operation is generally dependent on whether the molding material has thermoplastic or thermosetting characteristics. Injection molding is the principle method of forming thermoplastic materials. In injection molding, plastic material is conveyed into a heated material feed cylinder, and a screw or plunger pushes the material through the cylinder where it is softened to a fluid or plasticized state. The discharge end of the injection cylinder terminates in a nozzle which communicates with the cavity mold supporting structure. The arrangement is such that the heated fluid plastic is discharged at high pressure through the nozzle and into the relatively cool mold via the conventional gates and runners provided in the cavity mold supporting structure. When the plastic material that is injected into the closed mold cools to a solid state, the mold is opened and the molded plastic article is ejected from the apparatus. In view of the thermoplastic characteristics of the material, any such material remaining in the injection feed cylinder, and in the runners of the cavity mold supporting structure, is reheated to a fluid state for injection into the mold during a subsequent cycle of operation.

Transfer molding is the most generally used method of forming thermosetting plastic materials. In transfer molding, the material is conveyed into an unheated material feed cylinder whereupon a plunger pushes the material through the cylinder and through a conventional transfer pot into the cavity mold supporting structure. The material is now softened to a fluid or plasticized state by means of the heat being applied to the cavity mold. The material is then forced by the plunger into the heated mold, under pressure, via the conventional gates and runners provided in the cavity mold supporting structure. The plastic is cured into an infusible state in the closed mold, whereupon the mold is opened and the molded plastic article is ejected from the apparatus. In view of the thermosetting characteristics of the material, it is important that substantially all such material in the transfer feed cylinder and in the transfer pot be forced into the cavity mold supporting structure to reduce the likelihood of any such material being cured in the feed cylinder or pot, and thereby preventing the transfer of additional materials in a subsequent cycle of operation. It will be appreciated that when the molded plastic article is ejected from the apparatus, conventional means are provided for also removing the cured material from the cavity mold runners so as to provide a free and unobstructed path for the thermosetting plastic material to flow from the transfer feed cylinder to the cavity mold in the next subsequent operating cycle of the apparatus.

In view of the curing of thermosetting material into an infusible state, it is not practical or economically feasible to injection mold such material. This is because the plastic material must first be softened to a fluid or plasticized state, by the application of heat, in order to flow through the injection nozzle. However, since heat temperatures and time factors are so critical, it is difficult to prevent some curing of the thermosetting material from taking place in the injection feed cylinder. This causes frequent stoppage or breakdown of the apparatus which, in turn, results in many lost hours of machine operability.

Since thermosetting materials cannot be allowed to remain in the injection feed cylinder long enough to set or cure, attempts have been made in the past to use a reciprocating screwtype feed cylinder with low heating capacity to liquify the thermosetting plastic material just as it goes through the injection nozzle. Very little heat, if any at all, is applied to the rest or major portion of the cylinder itself. Attempts have also been made to use the same reciprocating screw-type feed mechanism in a material feed cylinder selected for transfer molding of thermosetting plastic materials. This permitted, to some limited degree, the dual purpose use of a reciprocating screw-type feed mechanism for an injection feed cylinder with high cylinder heating capacity and for a transfer feed cylinder with low cylinder heating capacity.

The dual purpose reciprocating screw-type feed mechanism has several major drawbacks. The use of such mechanisms in transfer feed cylinders for thermosetting materials is limited to a relatively small variety of short fiber and plain thermosetting resins. The screw component itself is rather expensive and is usually designed for use with a specific resin material. Thus, it is necessary to have several screws on hand depending on the particular resin material in use. The screws are subject to harsh wear and must be replaced frequently thus contributing materially to high replacement costs. Furthermore, many costly productive hours are lost due to machine downtime in interchanging an injection material cylinder with a transfer material feed cylinder, and vice versa, which requires several hours of setup time by skilled mechanics. In addition, even the low heating capacity of the transfer material feed cylinder causes some curing of the thermoset resins which results in stoppage of the operating cycle.

The difficulties and drawbacks referred to above have led many users of such molding apparatus to rely on separate units to perform injection molding and transfer molding operations, respectively. Thus, it is common today to use a screw-type feed mechanism in a heated injection material feed cylinder for injection molding of thermoplastic materials, and a separate conventional plunger-type feed mechanism in an unheated transfer material feed cylinder for transfer molding of thermosetting materials. These separate units operate independently of each other and provide for good quality control of the molded article at relatively low manufacturing costs. However, it will be appreciated that a great deal of duplication is necessary in operating separate units. For example, each unit requires a frame for supporting the moveable and fixed platens which, in turn, support the cavity mold pieces. Each unit also requires its own dispenser for conveying the molding material from a hopper to the material feed cylinder. Separate operating controls are also necessary for the respective units. The duplication of components common to both injection molding and transfer molding units require greater investment of capital and larger manufacturing facilities, which in turn, usually results in increased operating expenses and overall higher manufacturing costs.

Accordingly, an object of the present invention is to provide a molding apparatus which is selectively operable for either injection molding of thermoplastic materials or transfer molding of thermosetting materials.

Another object of the present invention is to provide a molding apparatus having component parts which are common to the operation of the apparatus, regardless of whether the apparatus is in the injection mode or transfer mode of operation.

A further object and feature of the present invention is to provide a novel dual piston displacement cylinder having a selectively variable stroke depending on whether the molding apparatus is in the injection mode or transfer mode of operation.

Another object and feature of the present invention is to provide a dual purpose molding apparatus for a wide variety of thermoplastic and thermosetting plastic resins. The apparatus utilizes a plunger-type feed mechanism in either the injection mode or transfer mode of operation for improved quality control of the molded article, and thereby eliminates the costly reciprocating screw-type feed mechanism heretofore used in injection molding equipment.

A further object, feature and advantage of the present invention is to provide a relatively inexpensive dual purpose molding apparatus for either injection molding or transfer molding, and which can be simply changed from one mode of operation to another in a relatively short period of time.

SUMMARY OF THE INVENTION

The molding apparatus of the present invention includes a frame on which is supported in conventional manner the cavity mold supporting structure. This includes a pair of laterally spaced platens, one of which being fixed in position and the other one of said platens being reciprocally moveable toward and away from the fixed platen. Mounted on the opposed facing surfaces of the platen are the cavity mold pieces which are disposed to form a closed mold upon relative movement of said platens toward each other, and to open the mold upon relative movement of said platens away from each other. A flow through passageway is formed in the fixed platen and in the associated cavity mold pieces for directing molding material to the cavity mold in its closed position.

A novel transfer structure is provided for transferring the molding material through the flow through passageway and into the cavity mold. The structure comprises an interchangeable material feed cylinder selected for either injection molding of thermoplastic material or transfer molding of thermosetting material. A dispensing structure is also provided on the frame for transmitting the particular molding material from a hopper to the selected material feed cylinder.

The transfer structure also includes a dual piston displacement cylinder mounted on the frame and having a selectively variable stroke. The cylinder is partitioned into a pair of separate chambers having an interconnecting passageway. Separate piston means are located in each chamber and are in communication with each other via said passageway. The transfer structure further includes a plunger having one end connected to one of said piston means for conjoint movement therewith; and the opposite end slideably received within the selected material feed cylinder and moveable therein for feeding the molding material through the feed cylinder. Flow means are provided in the displacement cylinder for directing a pressure to one of said pair of chambers for displacing said one of said piston means to its operating position. Control means are also provided for controlling the length of travel of said one of said piston means depending upon the material feed cylinder selected for use in the apparatus.

Additional features and advantages of the present invention will become more apparent from a consideration of the following detailed description when taken in conjunction with the accompanying drawings.

BRIEF DESCRIPTION OF THE DRAWINGS

FIG. 2 is a right side elevational view, with parts broken away, of the molding apparatus illustrated in FIG. 1;

FIG. 3 is a view similar to FIG. 1 with the interchangeable material feed cylinder selected for transfer molding;

FIG. 4 is an enlarged elevational view, partly in section and with parts broken away, of the dual piston displacement cylinder illustrated in FIGS. 1 and 3;

FIG. 5 is an enlarged elevational view, partly in section and with parts broken away, illustrating the connection of the selected injection material feed cylinder to the fixed platen of the molding apparatus; and FIG. 6 is a view similar to FIG. 5 illustrating the connection of the selected transfer material feed cylinder to the fixed platen of the molding apparatus.

DESCRIPTION OF THE PREFERRED EMBODIMENTS

Figure 1:
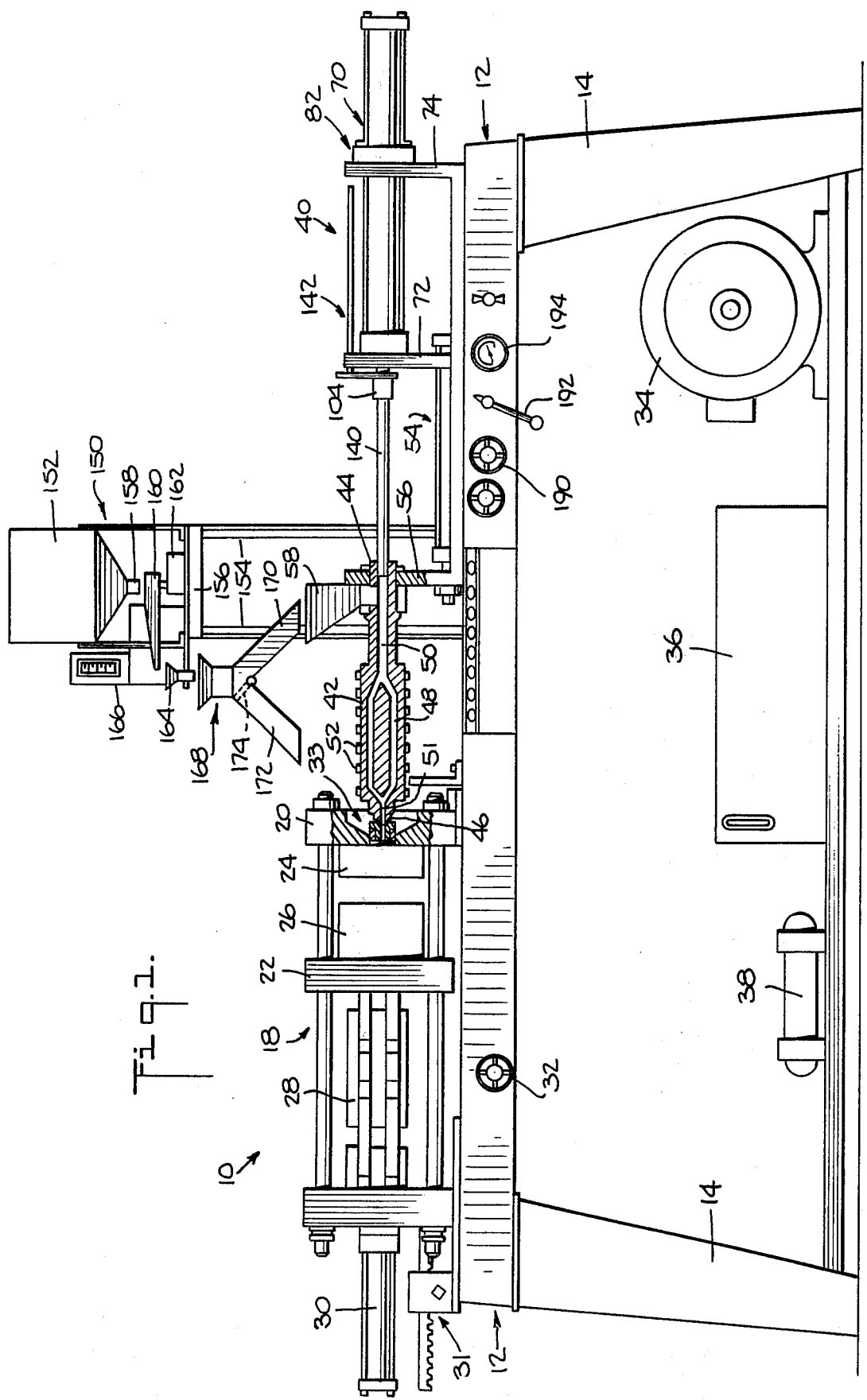
FIG. 1 is a front elevational view, partly in section and with parts broken away, of the molding apparatus constructed in accordance with the present invention, with the interchangeable material feed cylinder selected for injection molding; 489,428.

Referring to the drawings, and more particularly to FIGS. 1, 2 and 3, numeral 10 represents a molding apparatus constructed in accordance with the present invention. Apparatus 10 includes an elongated frame 12 constructed of heavy steel having a plurality of legs 14 depending downwardly to the floor or other supporting surface. Frame 12 is illustrated as extending horizontally in the direction similar to that provided for conventional horizontal injection molding. However, it is to be understood that the invention is not limited to such horizontal movement, and that the apparatus could be disposed to move otherwise, such as in a vertical direction which is the direction commonly provided for transfer molding machines. Frame 12 further includes a pair of spaced I-beams 16, 16, as illustrated in FIG. 2, for supporting the cavity mold structure represented generally by numeral 18 in conventional manner. In this regard, frame 12 is formed with suitable openings under the cavity mold structure 18 to facilitate removal of the molded articles. The heavy steel I-beams 16, 16 are designed to provide adequate support for the apparatus during closure of the cavity mold and the subsequent injection pressures exerted during the molding cycle.

Referring to FIGS. 1 and 3, the cavity mold structure 18 is supported on the left-hand side of frame 12 and includes a fixed platen 20 and a moveable platen 22 mounted for reciprocal movement toward and away from the fixed platen 20. Cavity mold pieces 24, 26 are mounted on platens 20, 22, respectively, and are disposed to form a closed mold upon relative movement of said platens toward each other and to open the mold upon relative movement of said platens away from each other. Movement of platen 22 is effected hydraulically in conventional manner by means of clamp linkage 28 and clamp cylinder 30. Suitable components and controls are provided for controlling the movement of platen 22 relative to fixed platen 20; such as, the rack and pinon structure 31 and clamp speed control 32. The cavity mold pieces 24, 26 can be of many forms to suit a specific application. In this regard, attention is directed to applicant's co-pending application for a Mold Base, identified as Ser. No. 489, 428, filed July 17, 1974, which illustrates a specific manner in which cavity mold pieces are mounted in an apparatus for molding plastic articles. Conventional means are provided (not shown) for applying and controlling the application of heat to the cavity mold pieces 24, 26, as required. Furthermore, cavity mold pieces 24, 26 are formed with the usual gates and runners (not shown) for directing the molding material into the mold in its closed condition. The molding material is transferred to the gates and runners via a passageway represented generally by numeral 33 formed in fixed platen 20 and its associated cavity mold piece 24. Passageway 33 thus represents flow through means for directing molding material to the cavity mold. Located below frame 12 and intermediate the supporting legs 14 are a conventional motor and pump 34, an oil reservoir 36, and a heat exchanger 38. All of the above components are standard in the art so that a more detailed description of the function and operation of said components in connection with molding apparatus in general is not deemed necessary.

Transfer means represented generally by numeral 40 are mounted on frame 12 for transferring the molding material through passageway 33 to the cavity mold. In accordance with the teachings of the present invention, the transfer means include an interchangeable material feed cylinder selected either for injection molding of thermoplastic material or transfer molding of thermosetting material. Referring to FIG. 1, the interchangeable material feed cylinder is represented by numeral 42 which is selected for injection molding. Injection feed cylinder 42 is formed having an inlet manifold 44 at one end and an injection nozzle 46 at its other end disposed in communication with the flow through passageway 33 in fixed platen 20. Injection feed cylinder 42 is conventional in construction in providing a plurality of passageways 48 interconnecting the inlet manifold 44 with the injection nozzle 46. More specifically, passageways 48 connect with inlet manifold 44 via enlarged passageway 50 and said passageways connect with injection nozzle 46 via reduced passageway 51. Injection feed cylinder 42 further includes conventional heater bands 52 which serve to soften the molding material to a fluid or plasticized state during passage of the material therethrough.

The inlet manifold 44 of injection feed cylinder 42 is supported on an upstanding bracket of a moveable carriage represented generally by numeral 54 mounted on frame 12 and disposed for reciprocal movement toward and away from fixed platen 20. One end of carriage 54 has an upstanding bracket 56 which serves to support the inlet manifold 44 of injection feed cylinder 42 as referred to above. Bracket 56 also supports an upright funnel 58 having its discharge end suitably connected to the inlet manifold 44 and in communication with enlarged passageway 50 of injection feed cylinder 42. The mouth of funnel 58 communicates with a material feed hopper, as will become hereinafter apparent, for dispensing and conveying said material to the inlet manifold 44 of said injection feed cylinder 42.

Referring more specifically to FIG. 5, there is illustrated the manner in which the discharge end of injection feed cylinder 42 is connected to fixed platen 20. In this regard, a conventional transfer pot 60 is received within passageway 33. However, since the through opening of transfer pot 60 has a transverse dimension substantially greater than the discharge opening of injection nozzle 46, it is necessary to press fit a sprue bushing 62 within transfer pot 60. Bushing 62 is formed having a tapered through opening 64 and is provided with a centrally located spherical recess 66 having a configuration which corresponds to the outer configuration of injection nozzle 46. Bushing 62 is located with its reduced through opening end communicating with the discharge end of injection nozzle 46, whereby the complementary shaped configurations of recess 66 and the discharge end of nozzle 46 serve to facilitate the nesting relation of said components during assembly of the apparatus. If necessary, one or more support brackets can be mounted on frame 12 for engagement with portions of injection feed cylinder 42 to assure that said cylinder is in properly aligned relation with fixed platen 20 during the assembly and operation of the apparatus.

Transfer means 40 further includes displacement means in the form of a dual piston displacement cylinder 70 having a selectively variable stroke. As will become hereinafter apparent, the length of travel of the displacement means is a function of the material feed cylinder selected for use in the apparatus. Displacement cylinder 70 is firmly supported on moveable carriage 54 by means of upstanding bracket supports 72, 74 and is thus disposed for conjoint movement with carriage 54 relative to frame 12.

Referring more specifically to FIG. 4, displacement cylinder 70 is formed of an elongated housing 76 having a pair of laterally spaced chambers 78, 80 separated by a partition structure represented generally by numeral 82. Located within each of the chambers 78, 80 is piston means 84, 86, respectively, each disposed for movement from an initial rest position to an operating position. Piston means 84, 86 are illustrated in their respective rest positions in FIG. 4. Piston means 84 includes a piston head 88 and a connected piston rod 90 disposed for reciprocal movement within chamber 78. Piston means 86 is similarly constructed having a piston head 92 and a connected piston rod 94 disposed for reciprocal movement within housing 80. The arrangement is such that the axis of each piston rod coincides with the axis of the cylindrical housing 76.

A passageway 96 is formed in the partition structure 82 to provide communication between chambers 78, 80. In other words, piston means 84 may be considered as being in communication with piston means 86 via the partition passageway 96. Housing 76 further includes a front wall 98 having a centrally located through opening 100. Piston means 84 is located such that, in the rest position thereof, the piston head 88 is disposed adjacent to a side surface portion of partition structure 82 and in overlying relation to passageway 96, with the connected piston rod 90 extending toward housing front wall 98. The threaded end 102 of piston rod 90 projects through front wall opening 100 and threadedly engages in a suitable coupling member 104. It will be appreciated that piston rod 90 also projects through and beyond bracket support 72 to permit engagement of threaded end 102 with coupling 104. Housing 76 further includes a rear wall 106. Piston means 86 is located within chamber 80 such that, in the rest position thereof, the piston head 92 is disposed adjacent to the inside surface portion of housing rear wall 106, with its connected piston rod 94 extending in the direction of partition structure 82. The end of piston rod 94 is received within partition passageway 96 and is located adjacent piston head 88. It will thus be appreciated that movement of piston means 86 in the left direction as viewed in FIG. 4 also serves to displace piston means 84 in the same direction. In this regard, the dimensions of piston heads 88, 92 are such that they cannot be received in partition passageway 96 during respective movements thereof. This is readily achieved by providing for the width or transverse dimension of said pistons to be greater than the corresponding width or transverse dimension of said partition passageway. Furthermore, suitable sealing means are provided to substantially prevent the pressure in chamber 78 from flowing into chamber 80, and vice versa; such sealing means being represented by packing material 108, O-ring 110 and piston rings 112.

Flow conduits are also provided in displacement cylinder 70 for directing a pressure into chambers 78, 80 for displacing piston means 84, 86 to their respective operate positions. The flow conduits consist of a separate inlet conduit and a discharge conduit for each of said chambers. Thus, with respect to chamber 78, an inlet conduit 114 is formed in partition 84 which provides communication between one side of piston head 88 and a pressure source (not shown) via conduit 116. A discharge conduit 118 is formed in housing front wall 98 which provides communication between the other side of piston head 88 and said pressure source via conduit 120. With respect to chamber 80, an inlet conduit 122 is formed in housing rear wall 106 which provides communication between one side of piston head 92 and said pressure source via conduits 124 and 116. A discharge conduit 126 is formed in partition 82 which provides communication between the other side of piston head 92 and said pressure source via conduits 128 and 120.

Flow control valves 130, 132 are provided in conduits 116, 124, respectively for rendering inlet conduits 114, 122 in either an open or closed condition. In this regard, as will become apparent from a description of the operation of displacement cylinder 70, one of said valves 130, 132 is in its open condition while the other one of said valves is in its closed condition. Directional control valves, represented generally by numeral 134, are provided for changing the pressure flow path to direct a pressure into chambers 78, 80 via the discharge conduits 118, 126 and thus cause piston means 84, 86 to move back to their original rest positions.

Transfer means 40 further includes a plunger 140 having one end suitably connected to coupling 104 for conjoint horizontal movement with piston rod 90. The other end of plunger 140 is suitably mounted to the inlet manifold 40 of injection feed cylinder 42. The arrangement is such that the other end of plunger 140 is slideably received within passageway 50 of cylinder 42 and moveable therein for feeding molding material through said cylinder. A tie rod assembly 142 serves to connect coupling 104 to carriage support 72 to insure alignment of piston rod 90 with the said one end of plunger 140.

As previously indicated, displacement cylinder 70 is constructed having a selectively variable stroke. This is achieved by providing for the length of chamber 78 to be greater than the corresponding length of chamber 80. Thus, depending on which one of the control valves 130, 132 is open and which one of said valves is closed, the length of travel of displacement cylinder 70 is computed as being either the longer distance from piston head 88 to housing front wall 98 or the shorter distance from piston head 92 to partition 82. For example, when apparatus 10 is disposed for injection molding of thermoplastic materials, as illustrated in FIG. 1, it is required that displacement cylinder 70 be operated at its shorter stroke to thus limit the extent to which plunger 140 slideably moves within injection feed cylinder 42. This is achieved by closing valve 130 and opening valve 132. Pressure is thus permitted to enter chamber 80 and exert a force on one side of piston head 92 causing said piston head to be displaced to the left, as viewed in FIG. 4, until piston head abuts against partition 82. The aforesaid displacement represents the operating position of piston means 86. Such displacement also causes the end of piston rod 94 to abut against one side of piston head 88 and displace said piston head and its connected piston rod 90 a corresponding distance to the left, which distance represents the operating position of piston means 84 when injection feed cylinder 42 is selected for use in the apparatus. In the preferred embodiment, the diameter of piston rod 94 is greater than the corresponding diameter of piston rod 90 to increase the bearing area of piston rod 94 against the piston head 88 when apparatus 10 is in its injection mode. Displacement of piston means 84 to its operating position serves to displace or advance plunger 140 a corresponding distance, via coupling 104, and causes the end of plunger 104 to move within passageway 50 of injection feed cylinder 42 for feeding molding material therethrough and through bushing 64 into the cavity mold.

It will be appreciated from the above description, that when apparatus 10 is in its injection mode, the length of travel of displacement cylinder 70 is represented as the distance from piston head 92 to partition 82. Furthermore, since the length of chamber 78 is greater than the corresponding length of chamber 80, the displacement of piston means 84 to its operating position serves to locate piston head 88 spaced from housing front wall 98.

Referring again to FIG. 1, apparatus 10 further includes dispensing means represented generally by numeral 150 for transmitting the proper amount of molding material to injection feed cylinder 42. The dispensing means comprises a material storage hopper 152 mounted on frame 12 by means of upstanding supports 154. A cross support 156 extends between the upstanding supports 154 and is spaced below the hopper discharge end 158. A vibrator 160 and associated motor 162 are mounted on cross support 156 and located adjacent the hopper discharge end 158. The discharge end of vibrator 160 is located adjacent the inlet end of a dump chute 164 which is operatively connected to a weighing scale 166. Dump chute 164 is positioned to discharge into the inlet throat of a conveyor, represented generally by numeral 168. Conveyor 168 terminates in a pair of discharge chutes 170, 172, through one of which chutes the molding material is dispensed depending on the material feed cylinder selected for use in the apparatus. In this regard, a valve 174 is provided in conveyor 168 to selectively control the directional flow of the molding material therethrough. Thus, when apparatus 10 is in its injection mode as illustrated in FIG. 1, valve control 174 is positioned to close off chute 172 so that the precise amount of molding material required for the injection molding operation is dispensed through chute 170 and into funnel 58. The molding material then flows through the inlet manifold 44 of injection feed cylinder 42 and into passageway 50, whereupon movement of plunger 140, as aforesaid described, serves to feed the material through cylinder 42 and through sprue bushing 62 into the cavity mold.

In view of the weighing scale 166, vibrator 160 and the plunger-type feed of the present invention, it is possible to obtain better quality control of the molded article due to the accurate weigh and vibrator feed of the molding material as distinguished over the volumetric measuring provisions of the molding material normally associated with screw-type feeding arrangements.

FIGS. 3 and 6 illustrate apparatus 10 having an interchangeable material feed cylinder represented by numeral 180 which is selected for transfer molding of thermosetting plastic material. Transfer feed cylinder 180 is considerably shorter in length than injection feed cylinder 42 and is formed having an inlet manifold 182 at one end suitably supported by upright carriage bracket 56. The discharge end of feed cylinder 180 is formed with an outwardly projecting lip or rim 184 which is sized to be positioned over the inlet end of transfer pot 60. Transfer feed cylinder 180 is conventional in construction in providing a through passageway 186 interconnecting the inlet manifold 182 with the discharge end of the feed cylinder. Transfer pot 60 also includes a through opening 188 having a transverse dimension corresponding to the transverse dimension of transfer cylinder passageway 186. Transfer feed cylinder 180 is mounted in position with its passageway 186 aligned with transfer pot passageway 188. Transfer feed cylinder 180 may thus be considered as being disposed in communication with the flow through passageway 33 in fixed platen 20 via transfer pot 60. The discharge end of funnel 58 is suitably connected to the inlet manifold 182 and is in communication with passageway 186 of transfer feed cylinder 180. If necessary, one or more support brackets can be mounted on frame 12 for engagement with portions of transfer feed cylinder 180 to assure that said cylinder is in properly aligned relation with fixed platen 20 during the assembly and operation of the apparatus.

In changing apparatus 10 from its injection mode to its transfer mode, it is necessary to move displacement cylinder 70 to the right, as viewed in FIG. 1, which serves to disengage plunger 140 from the inlet manifold 44 of injection feed cylinder 42. If necessary, funnel 58 may be removed from apparatus 10 so as to not interfere with the changeover procedure. Injection feed cylinder 42 can now be disengaged from sprue bushing 62 and removed from carriage support bracket 56. if necessary, carriage 54 can also be moved to the right to facilitate disengagement of feed cylinder 42 from the apparatus. Sprue bushing 62 is then removed from transfer pot 60 by placing a piece of brass stock between the sprue bushing 62 and the moveable platen 22 whereupon movement of platen 22 in the direction of fixed platen 20 causes the brass stock to push bushing 62 out of the transfer pot 60.

Transfer feed cylinder 180 is then mounted in position with its inlet manifold 182 supported in upstanding carriage bracket 56. Carriage 54 is then moved to the left, as viewed in FIG. 3 to mount the discharge end of feed cylinder 180 on transfer pot 60. Displacement cylinder 70 is then moved to the left to locate the end of plunger 140 within the inlet manifold 182. If it was previously necessary to remove funnel 58 from the apparatus during disengagement of injection feed cylinder 42, then the funnel 58 may now be repositioned to provide communication between conveyor 168 and the transfer feed cylinder passageway 186. In this connection, it will be noted from FIG. 3 that hopper 58 is now located adjacent the discharge end of chute 172. Accordingly, the directional valve 174 within conveyor 168 must now be positioned to close off chute 170 so that the precise amount of molding material required for the transfer molding operation will be dispensed through chute 172 and into funnel 58.

In view of the fact that transfer feed cylinder 180 is considerably shorter in length than injection feed cylinder 42, and that operation of apparatus 10 in its transfer mode requires that the distant end of plunger 140 travel through transfer feed cylinder passageway 186 and transfer pot passageway 188, it is necessary to increase or lengthen the stroke of displacement cylinder 70 when apparatus 10 is in its transfer mode. This is achieved by opening valve 130 and closing valve 132 thereby permitting a pressure to enter chamber 78 and exert a force on one side of piston head 88. This causes piston head 88 to be displaced to the left, as viewed in FIG. 4, until it abuts against housing front wall 98. The aforesaid displacement represents the operating position of piston means 84 when transfer feed cylinder 180 is selected for use in the apparatus. Displacement of piston means 84 to its operating position serves to displace or advance plunger 140 a corresponding distance, via coupling 104, and causes the end of plunger 140 to move through transfer feed cylinder passageway 186 and through transfer pot passageway 188 for feeding molding material therethrough and into the cavity mold. It will be appreciated from the above description that when apparatus 10 is in its transfer mode, the length of travel of displacement cylinder 70 is represented as the distance from piston head 88 to housing front wall 98.

In order to effect operation of the apparatus in a conventional manner, there is provided on frame 12 suitable controls for moving carriage 54 and displacement cylinder 70. Such controls are represented, for example, by pressure control 190, carriage control 192 and pressure gauge 194, and are well known in the art so that a detailed description of the same is not deemed necessary.

There is thus provided a relatively simple and low-cost apparatus which is selectively operable for either injection molding of thermoplastic material or transfer molding of thermosetting material. Changeover from the injection mode to the transfer mode, and vice versa, is effected quickly in a relatively short period of time. It will be appreciated that since a plungertype feed mechanism is employed regardless of whether apparatus 10 is in the injection mode or the transfer mode, many of the problems heretofore recited in connection with a reciprocating screw-type feed cylinder are eliminated. Furthermore, since no heat is applied to the transfer feed material cylinder 180, there is no likelihood of any curing of the thermosetting material taking place in the feed cylinder. All of the essential components of the apparatus are mounted on a common frame and, except for the interchangeable material feed cylinder and the sprue bushing, the components are essentially the same thus avoiding unnecessary duplication costs and expenses in operating separate injection molding and transfer molding units.

While preferred embodiments of the invention have been shown and described in detail, it will be readily appreciated that numerous omissions, changes and additions may be made without departing from the spirit and scope of the present invention.

I claim:
1. A dual mode molding apparatus comprising:
a frame,
first and second laterally spaced platens mounted on said frame, at least one of said platens being movable relative to said frame, said platens being reciprocally movable relative to one another,
cavity mold pieces mounted on said platens and disposed to form a closed mold upon relative movement of said platens toward each other and to open the mold upon relative movement of said platens away from each other,
said first platen including a first through opening in communication with the mold cavity defined by said mold when in said closed state,
a removable first mode feed cylinder having a second through opening, said first mode feed cylinder adapted to be mounted adjacent said first platen and, when so mounted, said second through opening being in communication with said first through opening,
a removable second mode feed cylinder having heating means and an outlet nozzle, said second mode feed cylinder adapted to be mounted adjacent said first platen,
a removable sprue adapted to be inserted in said first through opening,
said sprue mating with said nozzle when said sprue is so inserted and when said second mode feed cylinder is so mounted,
a plunger mounted on said frame for reciprocal lateral movement, and
means operatively connected to said plunger for adjusting the stroke of said plunger to provide first and second stroke modes for said plunger,
when said first mode feed cylinder is so mounted and said plunger is in said first stroke mode, said plunger having a stroke that extends through said second through opening and through said first through opening into said mold,
when said second mode feed cylinder is so mounted and said plunger is in said second stroke mode, said plunger having a stroke that extends partially into said second mode feed cylinder,
the stroke of said plunger in said second mode being substantially less than the stroke of said plunger in said first mode.

2. The molding apparatus of claim 1 wherein said first platen is fixed relative to said frame.

3. The molding apparatus of claim 1 wherein said means for adjusting the stroke of said plunger comprises:
first and second pistons deployed in tandem, each of said pistons having a piston rod and a piston head,
first and second piston housings defining first and second chambers, said first and second piston being mounted for reciprocal movement within said first and second chambers, respectively,
a partition wall between said first and second chambers, said partition wall having a through opening, said second piston rod extending through said opening in said partition wall,
said plunger being connected to said first piston rod,
the stroke of said first piston being equal to the stroke of said plunger in said second mode and the stroke of said second piston being equal to the stroke of said plunger in said first mode.

4. The molding apparatus of claim 3 wherein said means for adjusting the stroke of said plunger comprises:
first and second pistons deployed in tandem, each of said pistons having a piston rod and a piston head,
first and second piston housings defining first and second chambers, said first and second pistons being mounted for reciprocal movement within said first and second chambers, respectively,
a partition wall between said first and second chambers, said partition wall having a through opening, said second piston rod extending through said opening in said partition wall,
said plunger being connected to said first piston rod,
the stroke of said first piston being equal to the stroke of said plunger in said second mode and the stroke of said second piston being equal to the stroke of said plunger in said first mode.

* * * * *